United States Patent [19]
Chitayat

[11] Patent Number: 5,936,319
[45] Date of Patent: Aug. 10, 1999

[54] WIRELESS PERMANENT MAGNET LINEAR MOTOR WITH MAGNETICALLY CONTROLLED ARMATURE SWITCHING AND MAGNETIC ENCODER

[75] Inventor: Anwar Chitayat, Fort Salanga, N.Y.

[73] Assignee: Anorad Corporation, Hauppauge, N.Y.

[21] Appl. No.: 09/055,573

[22] Filed: Apr. 6, 1998

Related U.S. Application Data

[63] Continuation-in-part of application No. 09/031,009, Feb. 26, 1998, application No. 09/031,287, Feb. 26, 1998, and application No. 09/040,132, Mar. 17, 1998.

[51] Int. Cl.$^6$ ..................................................... H02K 41/00
[52] U.S. Cl. ............................................. 310/12; 318/135
[58] Field of Search ................................ 310/12, 13, 14, 310/68 B, 68 R; 318/135

[56] References Cited

U.S. PATENT DOCUMENTS

| | | | |
|---|---|---|---|
| 4,689,530 | 8/1987 | Nakamura et al. | 318/135 |
| 4,789,815 | 12/1988 | Kobayashi et al. | 318/135 |
| 5,023,495 | 6/1991 | Ohsaka et al. | 310/12 |
| 5,091,665 | 2/1992 | Kelly | 310/12 |
| 5,793,128 | 8/1998 | Nanba et al. | 310/12 |
| 5,831,352 | 11/1998 | Takei | 310/12 |

*Primary Examiner*—Nestor Ramirez
*Assistant Examiner*—Judson H. Jones
*Attorney, Agent, or Firm*—Morrison Law Firm

[57] ABSTRACT

A linear motor employs motor permanent magnets in a movable stage interacting with armature windings in a path of the movable stage. Drive power to each individual armature winding is through a magnetically controlled switch. A switching magnet affixed to and moving with the stage actuates only those magnetically controlled switches that control power to armature windings that are within a magnetic influence of the motor permanent magnets. All other armature windings remain cut off. An encoder magnet, having alternating magnetic polarities, is affixed to and moving with the stage. The encoder magnet passes within a magnetic influence of a stationary encoder sensor which applies a stage position signal to a motor controller. The combination of motor permanent magnets, switching magnet and encoder magnet provides a wireless system that does not require active elements on the stage. Additional magnets, at each end of the motor permanent magnets, maintain a sinusoidal magnetic field to the ends of the motor permanent magnets.

9 Claims, 14 Drawing Sheets

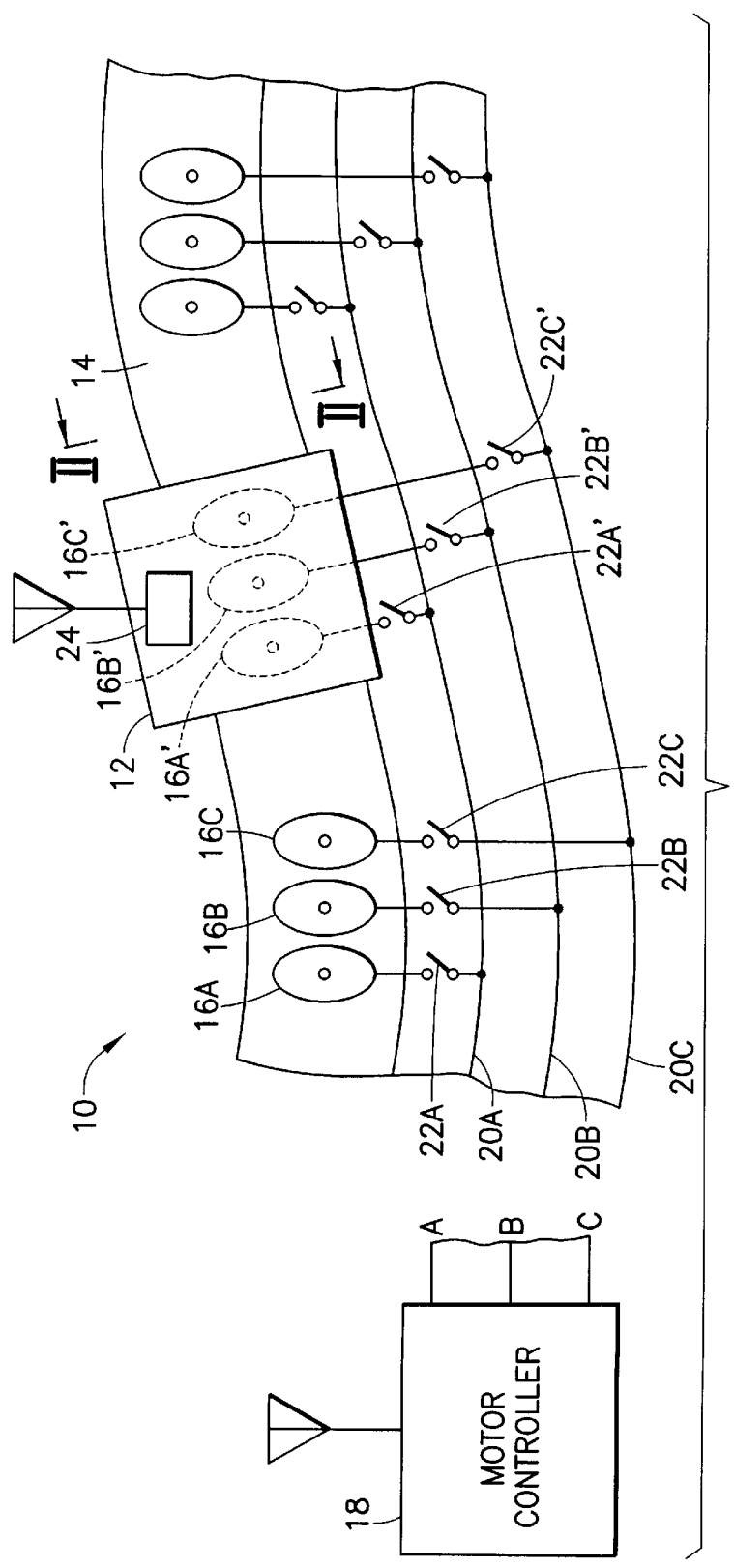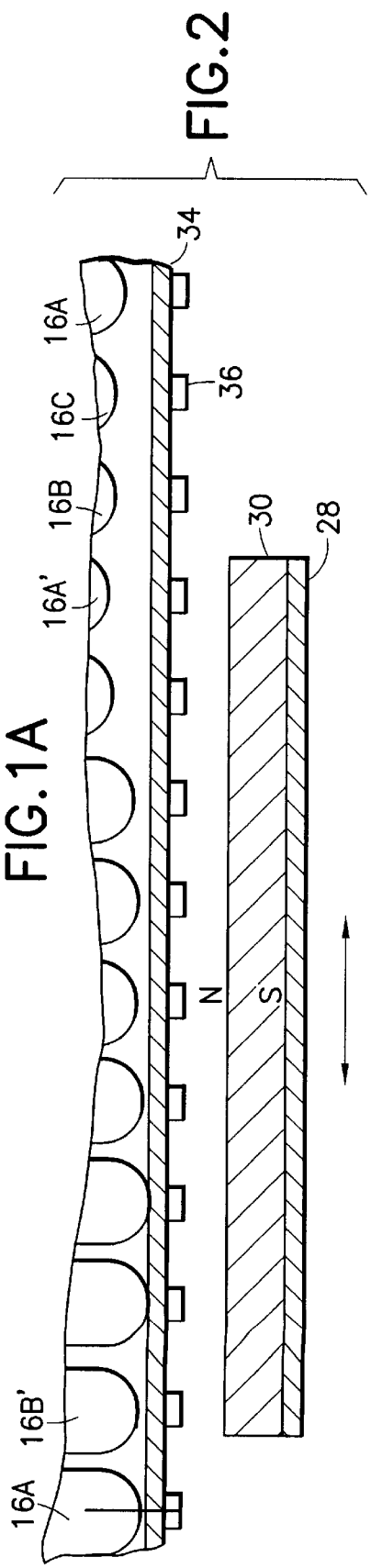

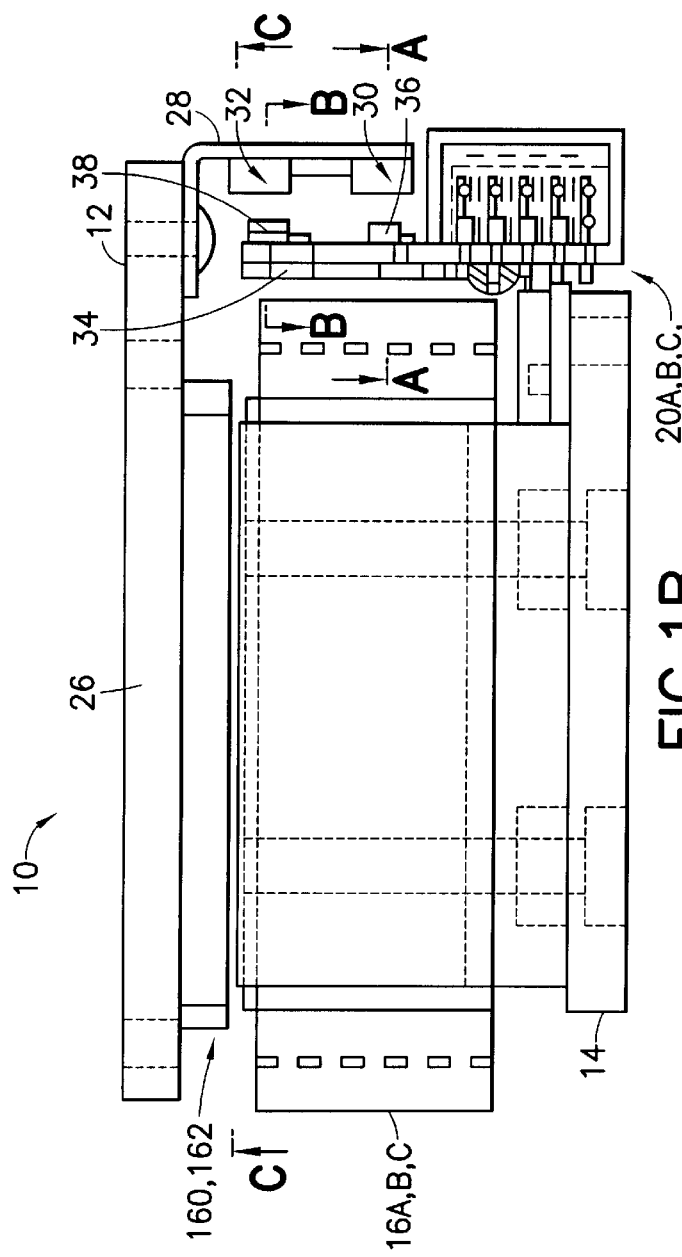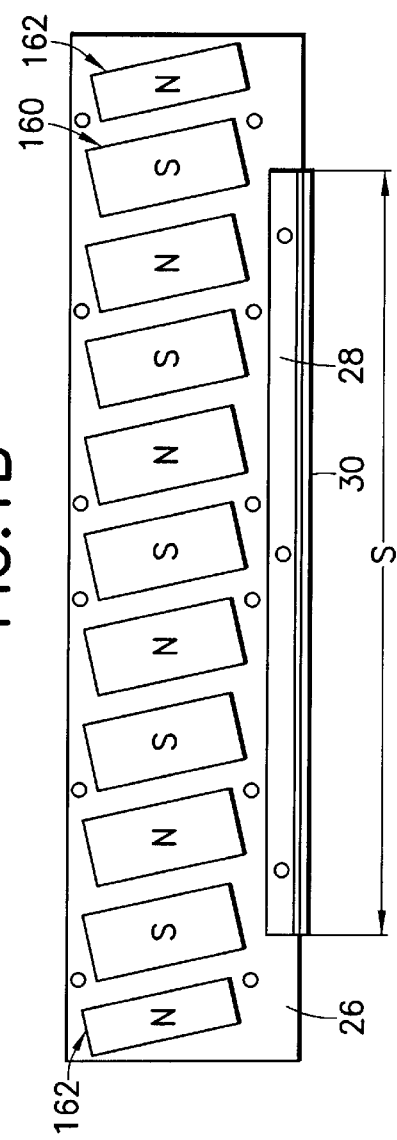
FIG.1B
FIG.3

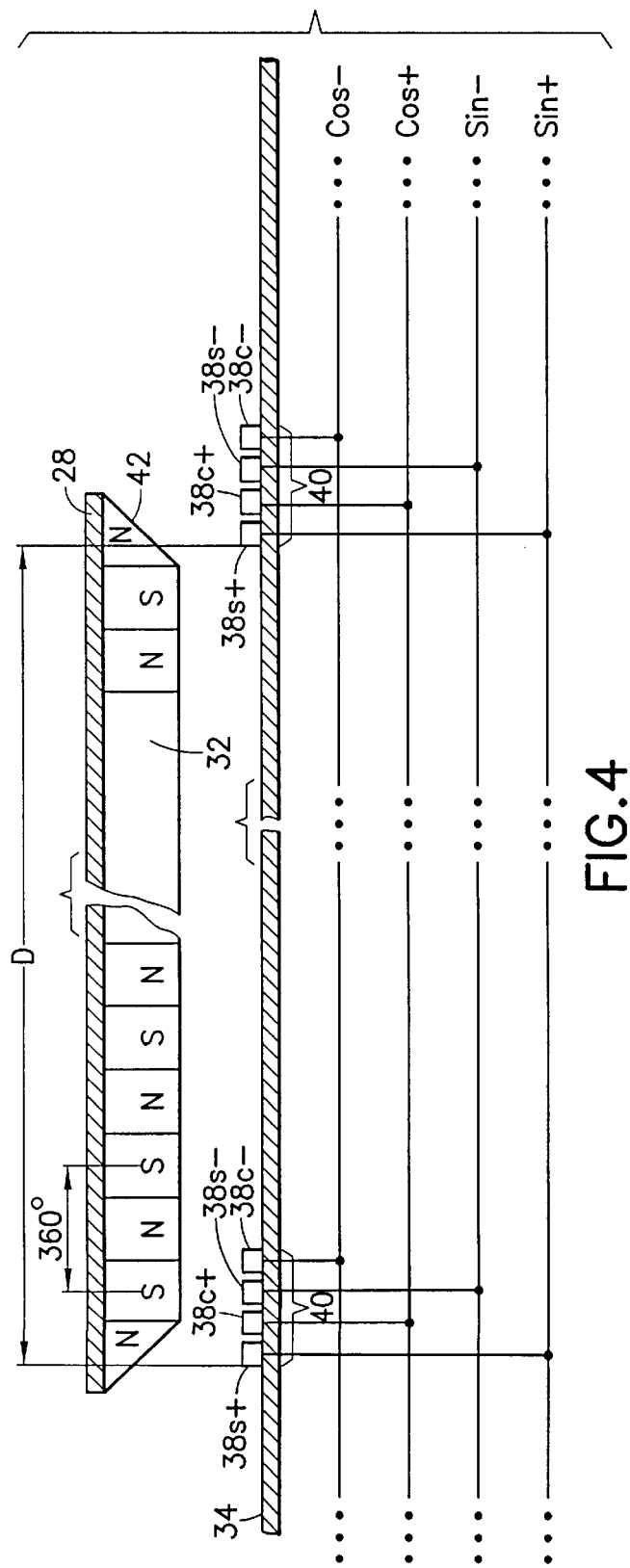
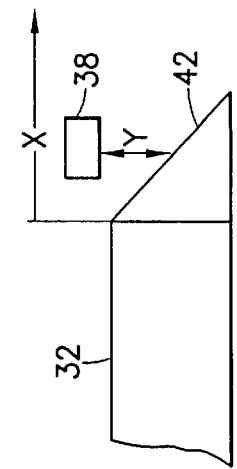
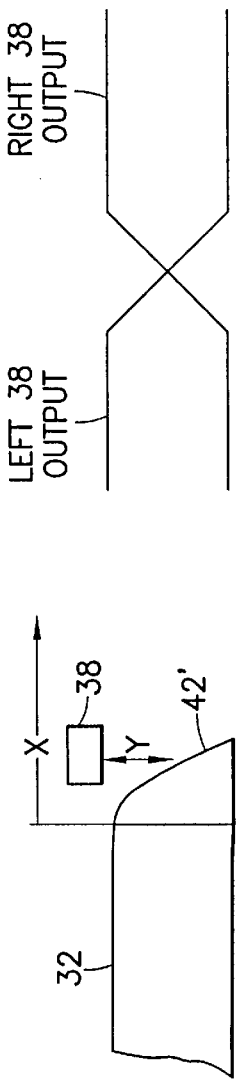
FIG. 4
FIG. 4A
FIG. 4B
FIG. 4C

WIRELESS PERMANENT MAGNET LINEAR MOTOR WITH MAGNETICALLY CONTROLLED ARMATURE SWITCHING AND MAGNETIC ENCODER

The present application is a continuation in part of U.S. patent application Ser. No. 09/031,009 entitled "LINEAR MOTOR HAVING AUTOMATIC ARMATURE WINDINGS SWITCHING AT MINIMUM CURRENT POINTS" filed Feb. 26, 1998, and U.S. patent application Ser. No. 09/031,287 entitled "LINEAR ENCODER" filed Feb. 26, 1998, and U.S. patent application Ser. No. 09/040,132 entitled "MODULAR WIRELESS LINEAR MOTOR", filed Mar. 17, 1998.

BACKGROUND OF THE INVENTION

The present invention relates to a linear motor and, more particularly to a wireless linear motor which requires no wire connection to its movable stage.

Linear motors having stationary armatures containing coils and movable stages containing magnets are well known in the art. Also known are linear motors having stationary magnets and moving coils.

One type of such linear motors is disclosed in U.S. Pat. No. 4,749,921. The linear motor of the referenced disclosure has a series of armature windings mounted to a base plate, and a stage having a series of magnets that is free to move on the base plate. The stage is urged in the desired direction by applying AC or DC excitation to the coils. When such a linear motor is used in a positioning system, the relationship between the location of the stage and locations of the coils must be accounted for.

In one linear motor, commutator contacts are pendant from the stage. The contacts contact one or more power rails, and one or more coil contacts. As the stage moves along the armature, the location of the stage, relative to the armature is automatically accounted for by applying power to the stationary armature windings through the commutator contacts.

In other linear motors, it is conventional to employ a service loop of wires between the moving stage and the stationary elements. The location of the stage is updated using a magnetic or optical position encoder on the stage which senses markings on an encoder tape stationary alongside the path of the stage. The location is connected on the service loop to a stationary motor controller.

Generally, the important location information is the phase of the stage relative to the phase of the armature. For example, in a three-phase armature, the windings are disposed in repeating sets of three for phases A, B and C. If the center of the A phase winding is arbitrarily defined as 0 degrees, then the centers of the B and C windings are defined as 120 and 240. There may be two, three or more sets of windings as required for the travel distance of the stage. Normally, all A phase windings are connected in parallel. The same is true of all B and C phase windings. Thus, when the location of the stage requires a certain voltage configuration on the particular windings within the influence of the magnets on the stage, besides powering these windings, all of the other windings in the armature are also powered. The maximum force obtainable from a linear motor is limited by the allowable temperature rise in the armature windings. When all windings are powered, whether they contribute to motor force or not, more armature heating occurs than is strictly necessary for performing the motor functions.

Some linear motors in the prior art have responded to this heating problem using switches that are closed only to the armature windings actually within the influence of the magnets.

The need for a cable loop connecting moving and stationary elements is inconvenient, and limits the flexibility with which a system can be designed. The wiring harness requires additional clearance from the linear motor to prevent entanglement between the motor and any equipment or items that may be adjacent to the linear motor path. In addition, the wiring harness adds additional weight to the moving element of the linear motor. Furthermore, manufacturing of a linear motor employing a wiring harness incurs additional cost of material and assembly labor. Therefore, it would be desirable to eliminate the use of a wiring harness in a linear motor to decrease the cost of assembly, decrease the overall weight of the moving element, and to eliminate the clearance restrictions on the linear motors utility.

Most linear motors are manufactured to be of a predetermined fixed length. This establishes the length of the armature, and consequently the number of armature windings. In order to make a new linear motor of any specific length, a new assembly must be tooled. Each assembly has a set number of armature windings, a set number of moveable magnets, and, a fixed length wiring harness associated with the moveable element of the linear motor. The cost of producing a linear motor is increased because each assembly must be custom designed to a users needs, with new tooling required for each such design. Therefore, it is particularly desirable to produce a linear motor of a modular design.

A modular designed motor would allow easy customization for any desired length armature winding assembly. The cost of manufacturing a particular linear motor would be decreased since the cost of tooling would be minimal. A data base of assembly and outline drawings will be common to all assemblies within a family of linear motors, easing assembly and manufacturing. A stocking of common parts would allow quick assembly of any special length motor assembly, from now readily available parts. The stocking of common parts also decreases overall cost of manufacturing since materials will be bought in bulk from common suppliers. The assembly of any desired length armature winding assembly will enjoy a decreased lead time. As such, a modular designed linear motor provides for a decrease in manufacturing cost, decrease in lead time to assemble, and increases overall utility.

Linear motors using a series of stationary armature windings and moving magnets require a means to dissipate heat from the coils. Linear motors having cold plates mounted on one edge of an armature winding are known in the art. Alternatively, armature windings having cooling coils or channels are also well known in the art. Examples of such armatures are disclosed in U.S. Pat. No. 4,839,545. These armatures use stacked laminated magnetic material.

Linear motors having non-magnetic armatures are also known, an example of which is disclosed in U.S. Pat. No. 4,749,921. The linear motor of the referenced disclosure has a non-magnetic armature which includes a coil support structure composed of an aluminum frame or a serpentine cooling coil. In the embodiment having an aluminum frame, heat is carried away from the coils of the armature via the aluminum frame and a side plate which functions as a heat sink. Alternatively, a serpentine coil may be employed to effect more uniform cooling within the armature. The serpentine coils support the overlapping coils while the coils and the armature are cast in a block of settable resin. However, the incorporation of such a coil has the disadvantage of increasing costs because of the complexity of assembly and material expenses. Furthermore, while the use of the settable resin prevents the occurrence of eddy currents, the thermal conductivity of the settable resin is significantly less than that of metals which it replaces and thus reduces the power dissipation capacity of the linear motor.

Linear motors are increasingly being employed in manufacturing equipment. In such equipment, nominal increases in the speed of operation translate into significant savings in the cost of production. Therefore, it is particularly desirable to produce as much force and acceleration as possible in a given linear motor. An increase in force generated requires either an increase in magnetic field intensity or an increase in current applied to coils of the armature. In a permanent magnet linear motor, the available magnetic field intensity is limited by the field strength of available motor magnets. Power dissipated in the coils increases at a rate equal the square of the current. Attendant heat generation limits the force that may be achieved without exceeding the maximum armature temperature. Therefore, improvements in the power dissipation capacity of linear motors provide for increases in their utility.

OBJECTS AND SUMMARY OF THE INVENTION

Accordingly, it is an object of the invention to provide a linear motor which overcomes the drawbacks of the prior art.

It is a further object of the invention to provide a linear motor that uses magnetically actuated armature winding switching, magnetically actuated linear encoding, and permanent magnet motor magnets.

It is a still further object of the invention to provide a wireless linear motor to eliminate the need for a wiring harness to decrease the cost of assembly, decrease the weight of such assembly, and to decrease the required clearance surrounding the motor.

It is yet another object of the invention to provide a wireless linear motor with improved cooling which overcomes the drawbacks of the prior art.

Briefly stated the present invention provides a linear motor that employs motor permanent magnets in a movable stage interacting with armature windings in a path of the movable stage. Drive power to each individual armature winding is through a magnetically controlled switch. A switching magnet affixed to and moving with the stage actuates only those magnetically controlled switches that control power to armature windings that are within a magnetic influence of the motor permanent magnets. All other armature windings remain cut off. An encoder magnet, having alternating magnetic polarities, is affixed to and moving with the stage. The encoder magnet passes within a magnetic influence of a stationary encoder sensor which applies a stage position signal to a motor controller. The combination of motor permanent magnets, switching magnet and encoder magnet provides a wireless system that does not require active elements on the stage. Additional magnets, at each end of the motor permanent magnets, maintain a sinusoidal magnetic field to the ends of the motor permanent magnets.

According to an embodiment of the invention, there is provided a linear motor comprising: a path, the path including a plurality of armature windings therein, a plurality of magnetically actuated switches, each one of the magnetically actuated switches being aligned with one of the armature windings, each of the magnetically actuated switches controlling application of motor drive power to its respective armature winding, a linear motor stage movable on the path, a plurality of motor permanent magnets on the stage facing the path, a switch permanent magnet movable with the stage, the switch permanent magnet being disposed in a position where it is effective to actuate those of the plurality of magnetically actuated switches which are within a magnetic influence thereof, the switch permanent magnet having a length and a position effective to actuate only those magnetically actuated switches controlling their respective armature windings which are within a magnetic influence of the plurality of motor permanent magnets, and to leave all others of the plurality of magnetically actuated switches unactuated, an encoder magnet movable with the stage, the encoder magnet including a plurality of magnetic zones having alternating magnetic polarities thereon, and at least one magnetically actuated encoder sensor positioned within an influence of the encoder magnet, whereby movement of the encoder magnet past the at least one magnetically actuated encoder sensor produces an encoder signal useful for determining a position of the stage.

According to a feature of the invention, there is provided a linear motor comprising: a path, the path including a plurality of armature windings therein, a movable stage movable on the path, a plurality of motor permanent magnets on the stage facing the path, first non-contact means for applying motor drive power only to those armature windings which are within a magnetic influence of the motor permanent magnets, and leaving a remainder of the armature windings cut off from the motor drive power, and second non-contact means for producing an encoder signal available off the stage.

According to a further feature of the invention, there is provided a magnet configuration for a permanent magnet linear motor stage, comprising: n motor magnets aligned side by side along a portion of a length of the stage, with alternating magnetic polarities, the stage being used with a path having a plurality of armature windings facing the n motor magnets, the armature windings receiving driving power effective for interaction with the n motor magnets to impose a force for moving the linear motor stage in a direction of the path, first and second additional permanent magnets, the first and second additional permanent magnets not interacting with armature windings to produce a force, the first additional permanent magnet being disposed parallel to the n motor magnets at a first end of the n motor magnets, the first additional permanent magnet having a magnetic polarity opposite to the magnetic polarity of the closest adjacent motor magnet, the second additional permanent magnet being disposed parallel to the n motor magnets at a second end of the n motor magnets, and the second additional permanent magnet having a magnetic polarity opposite to the magnetic polarity of the closest adjacent motor magnet, whereby a combined magnet field of the n permanent magnets is maintained substantially sinusoidal by the presence of the first and second additional permanent magnets.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1A is a simplified schematic diagram linear motor system according to an embodiment of the invention.

FIG. 1B a transverse cross section taken along II—II in FIG. 1.

FIG. 2 is a cross section taken along A—A in FIG. 1B, showing the switching magnet and switching sensors which control application of drive power to armature windings.

FIG. 3 is a cross section taken along C—C in FIG. 1B, showing the relationship between the switching magnet and motor magnets.

FIG. 4 is cross section taken along B—B in FIG. 1B showing the relationship between magnetic zones in the encoder magnet and the encoder sensors.

FIG. 4A shows a shape of a beveled magnetic zone about one of the encoder sensors from FIG. 4.

FIG. 4B shows the relationship between the output of the encoder sensors located at the left and right ends of the encoder magnets in FIG. 4, and the beveled magnet zone in FIG. 4A.

FIG. 4C shows another shape of a beveled magnetic zone about one of the encoder sensors from FIG. 4.

DETAILED DESCRIPTION OF THE PREFERRED EMBODIMENT

Figure 3A:
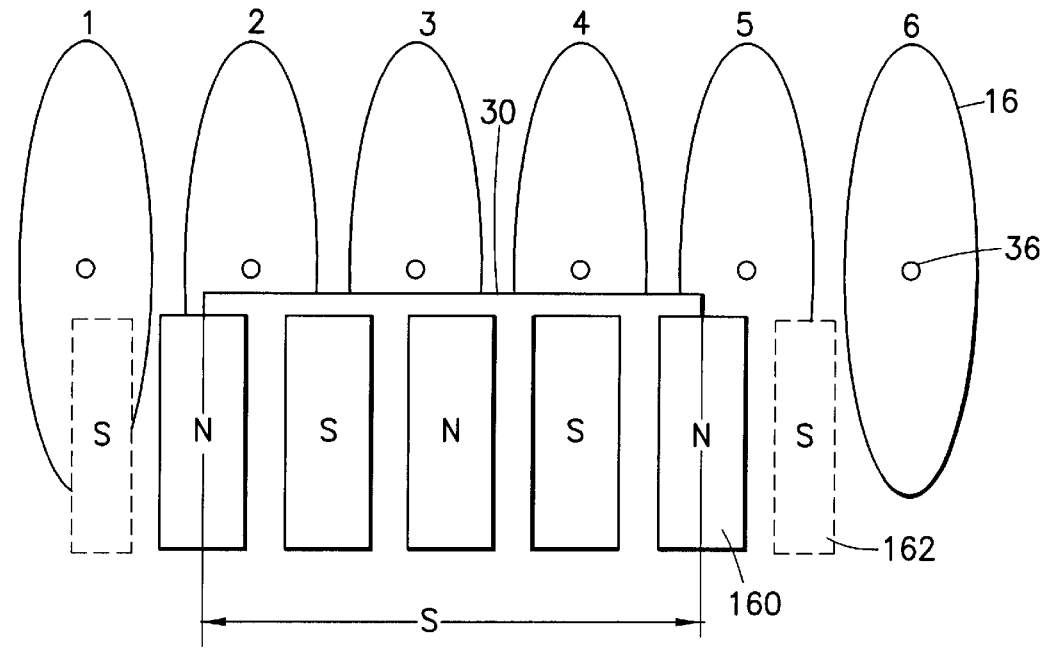
FIG. 3A is a cross section taken along C—C in FIG. 1B, showing, the positional relationship between the switching magnets and the motor magnets.

Referring to FIG. 1A, there is shown, generally at 10, a linear motor according to the invention. A movable stage 12 is supported and guided in any convenient manner along a path 14. Path 14 includes therein repeating sets of three armature windings 16A, 16B and 16C for receiving, respectively, phases A, B and C of three-phase drive power produced by a motor controller 18. Phase A of the drive power from motor controller 18 is connected on a phase-A conductor 20A to terminals of normally-open phase-A switches 22A. Each phase-A switch is connected to its associated phase-A armature winding 16A. Similarly, phase-B and phase-C drive power are connected on phase-B and phase-C conductors 20B and 20C to terminals of phase-B and phase-C switches 22B and 22C, all respectively. Armature windings 16A, 16B and 16C of each set are non-interleaved. That is, they lie side by side, not overlapping as is the case in some prior art linear motors.

All switches 22A, 22B and 22C remain open, except the switches associated with the particular armature windings 16A, 16B and 16C that are within the influence of motor magnets on movable stage 12. The closed switches 22A, 22B and 22C that are closed in this manner are indicated as 22A', 22B' and 22C', thereby apply power to corresponding armature windings 16A', 16B' and 16C'. As moveable stage 12 moves along path 14, those of switches 22A, 22B and 22C which newly come under the influence of the magnets on movable stage 12 close, and those moving out of the influence of the magnets are opened. Thus, at any time, only the armature windings 16A', 16B' and 16C' which can contribute to generating a force on movable stage 12 are powered. The remainder of armature windings 16A, 16B and 16C, not being useful for contributing to the generation of force, remain in a quiescent, unpowered, condition. This contributes to a reduction in power consumption, and a corresponding reduction in heating compared to prior-art devices in which all armature windings are powered, regardless of whether they are position to contribute to force.

In an application where "open-loop" drive of movable stage 12 is satisfactory, motor controller 18 produces the required sequence of phases to drive stage in the desired direction. However, one desirable application is a "closed-loop" drive system in which motor controller 18 receives feedback information from movable stage 12 indicating either its position along path 14, or increments of motion along path 14. A closed-loop system permits accurate control of position, velocity and acceleration of movable stage 12.

The prior art satisfies the requirement for position feedback using wiring between movable stage 12 and motor controller 18. This is inconvenient is some applications, and impractical in others. Impractical applications including travel of movable stage 12 along a path 14 which is closed upon itself. An example of such a path is an oval or "race-track" pattern of value in a robotic assembly operation. That is, movable stage 12 continues in a forward direction repeatedly traveling in the same direction on path 14. Wiring between the movable and stationary elements for such an application is either difficult or impossible to accomplish.

It will be noted that path 14 is shown as containing curves. It is a feature of the present invention that path 14 is not restricted to a straight line, as is frequently the case with the prior art. Instead, due to the nature of the present invention, linear motor 10 can be arranged to follow any desired path, including a straight path, curved path 14 as shown, or a closed path wherein movable stage 12 can repeatedly trace a closed path, moving in a single direction, or moving back and forth to desired locations anywhere along the open or closed path.

The embodiment of the invention in FIG. 1A includes a communications device 24 which wirelessly informs motor controller 18 about the position and/or incremental motion of movable stage 12. Communications device 24 is preferably a linear encoder which does not require connecting cables between stationary and movable elements, as will be explained.

In the preferred embodiment, at least some of the position or motion information is developed at stationary locations off movable stage 12, without requiring the transmission of position information.

It can be seen from the simplified drawing of FIG. 1A, and the description above, that linear motor 10 requires the following actions:

1) control of switches 22A, 22B, 22C
2) feedback of position or motion data
3) drive power generation related to position (or motion-derived position).

Referring to FIG. 1B, a cross section through path 14, looking at the end of movable stage 12 reveals a plurality of motor magnets 160, 162 below a plate 26. Lower surfaces of motor magnets 160, 162 are maintained closely parallel to an upper surface of armature windings 16A, 16B and 16C. Although it does not form a part of the present invention, armature windings 16A, B, C, may be wound on stacked laminations of magnetic metal. In this case, the lower surface of motor magnets 160, 162 are maintained closely parallel to an upper surface of the stacked laminations. Some applications may benefit from the reduction in static load on movable stage 12 provided when armature windings 16A, 16B and 16C contain no magnetic material. For purposes of later description, motor magnets 160, 162 are referred to as motor magnets. Armature windings 16A, B and C are energized as necessary to interact with motor magnets 160, 162 whereby a translational force is generated on movable stage 12.

A pendant arm 28 extends downward from plate 26. Pendant arm 28 has attached thereto a switching magnet 30 and an encoder magnet 32, both movable with movable stage 12. A rail 34, affixed to path 14, rises generally parallel to pendant arm 28. Rail 34 has affixed thereto a plurality of longitudinally spaced-apart switching sensors 36 facing switching magnet 30, and a plurality of longitudinally spaced-apart encoder sensors 38 facing encoder magnet 32.

Referring now to FIG. 2, switching sensors 36 are evenly spaced along rail 34. Each switching sensor 36 is preferably positioned on rail 34 aligned with its respective armature winding 16. In the embodiment shown, switching sensors 36 are Hall-effect devices. Switching magnet 30 has a length in the direction of travel roughly equal to the length of travel influenced by the magnetic fields of motor magnets 160, 162. This length is variable in dependence on the number of motor magnets used. In the illustrated embodiment, the length of switching magnet 30 is sufficient to influence nine switching sensors 36. That is, nine armature windings 16 (three sets of phases A, B and C) are connected at any time to their respective power conductors 20 for magnetic interaction with motor magnets 160, 162.

Switching sensors 36 control the open and closed condition of respective switches, as previously explained. Any convenient type of switch may be used. In the preferred embodiment, the switches are conventional semiconductor switches such as thyristors. Since semiconductor switches, and the technique for controlling their open/closed condition are well known to those skilled in the art, a detailed description thereof is omitted.

Referring now to FIG. 3, the underside of plate 26 includes nine motor magnets 160 equally spaced therealong. In addition, an additional motor magnet 162 is disposed at each end of the array of nine motor magnets 160. Motor magnets 160, 162 are tilted as shown in a conventional fashion to reduce cogging. It will be noted that the length of switching magnet 30 is approximately equal to the center-to-center spacing of the end ones of the set of nine full motor magnets 160. This length of switching magnet 30 defines the span S of the active portion of linear motor 10. That is, only those of armature windings 16 that lie within the span S receive power. As armature windings 16 enter the span S, they receive power, as they exit the span S, power is cut off.

Additional motor magnets 162, being outside the span, do not contribute to the generation of force because armature windings 16 below them are unpowered. However, additional motor magnets 162 perform an important function. It is important to the function of linear motor 10 that the magnetic field strength along plate 26 be generally sinusoidal. In the absence of additional motor magnets 162, the magnetic fields produced by the two motor magnets 160 at the ends of span S depart substantially from sinusoidal due to fringing effects. This produces ripple in the force output. The presence of additional motor magnets 162, by maintaining substantially sinusoidal magnetic field variations along motor magnets 160, avoids this source of ripple.

Additional motor magnets 162 are shown with widths that are less than that of motor magnets 160. It has been found that a narrower width in additional motor magnets 162 produces satisfactory results. However, it has also been found that a wider additional motor magnet 162 does not interfere with the function. From the standpoint of manufacturing economy, it may be desirable to employ only a single size magnet for both motor magnets 160 and additional motor magnets 162, thereby reducing stocking costs, and assembly costs.

Referring now to FIG. 3A, the positional relationships of switching magnet 30 and motor magnets 160, 162 are shown, using a reduced set of 5 motor magnets interacting with 4 armature windings, for purposes of explanation. As movable stage 12 moves, switching magnet and motor magnets 160, 162 move together with it, maintaining the same relative positions. As movable stage 12 moves along, those switching sensors 36 adjacent switching magnet 30 turn on their respective switches. Switching sensors 36 that are not adjacent switching magnet 30 maintain their respective switches turned off. In the condition shown, switching sensors 36 centered on armature windings 16-2, 16-3, and 16-4 are adjacent switching magnet 30, and these armature windings are connected to drive power. The switching sensors 36 centered on armature windings 16-1. 16-5 and 16-6 are not adjacent switching magnet 30, and therefore, these switching sensors 36 maintain armature windings 16-1, 16-5 and 16-6 cut off from drive power. The centers of all motor magnets 160 shown are offset from the centers of the armature windings 16 most closely adjacent. Therefore all turned-on armature windings 16 produce force by the interaction of their magnetic fields with the magnetic fields of the three nearest motor magnets 160.

Figure 3B:
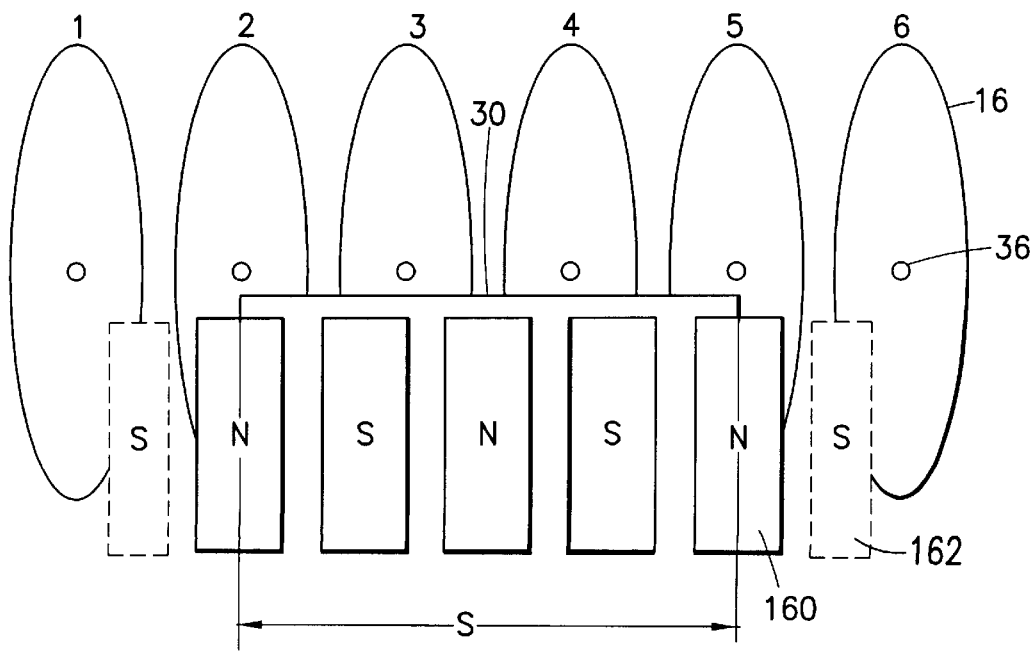
FIG. 3B is a cross section taken along C—C as in FIG. 3A, where the movable stage has moved to the right from its position in FIG. 3A.

Referring now to FIG. 3B, movable stage 12 has moved to the right from its position in FIG. 3A until the center of the right-hand motor magnet 160 is centered over the center of armature winding 16-5. In this relationship, the end of switching magnet 30 just reaches a position adjacent switching sensor 36. This is a minimum-current position. Thus, at this instant, switching sensor 36 closes its switch to connect armature winding 16-5 to its power source. In this center-overlapped condition, armature winding 16-5 is incapable of generating a force. Thus, the current in armature winding 16-5 is at a minimum, and the switching takes place at minimum current to armature winding 16-5. Similarly, at about this same instant, the left-hand end of switching magnet 30 passes off the switching sensor 36 aligned with armature winding 16-2, thereby cutting off power to armature winding 16-2. The center of left-hand motor magnet 160 is aligned with the center of armature winding 16-2 at this time. Thus, the current to armature winding 16-2 is minimum at this time. The above switching at minimum current reduces electrical switching noise which would be generated if switching were to take place at times when an energized armature winding 16 is generating force, or a deenergized armature winding 16 would generate a force immediately upon energization.

For a three-phase drive system, a minimum of five motor magnets is required to interact at any time with a minimum of four armature windings, or vice versa. If additional force is desired, magnets can be added in increments of four. That is, the number of magnets=5+4L where L is an integer, including zero. The number of armature windings in span S=(number of motor magnets in span S)−1. The embodiment in FIGS. 2 and 3 employ 5+(4×1)=9 magnets. The positioning of the magnets is such that the center-to-center spacing of the extreme ends of the 9 magnets is equal to the center-to-center spacing of 8 armature windings.

Referring now to FIG. 4, encoder magnet 32 includes alternating magnetic zones alternating with north and south polarities facing encoder sensors 38. Accordingly, each encoder sensor 38 is exposed to alternating positive and negative magnetic fields as encoder magnet 32 passes it. The zones at the extreme ends of encoder magnet 32 are beveled magnetic zones 42. Beveled magnetic zones 42 produce an increasing or decreasing magnetic field as it moves onto or off an encoder sensor 38. Beveled magnetic zones 42 are illustrated as linear ramps. Motors using such linear ramps have been built and tested successfully. However, a shape other than a linear ramp may give improved results. It is known that the magnetic field of a motor magnet decreases as the square of the distance from the magnet. Thus, to have an increase in magnetic field at one beveled zone that is substantially equal to the decrease in the magnetic field at the opposite magnetic zone, the bevel shape may be described by a squared law.

Referring momentarily to FIG. 4A, a shape of beveled magnetic zone which satisfies the rule that, for equal increments of motion of beveled magnetic zone 42', there are equal changes in magnetic field at encoder sensor 38 is represented by the equation:

$$y=a+bx^2$$

where:

y is the distance from the surface of the magnet to encoder sensor 38, x is the position along beveled magnetic zone 42', and a and b are constants.

Experience dictates that other factors besides the square law above affects the relationship between magnetic field and distance. The shape of beveled magnetic zones 42' may require modification from the square law to account for such other factors.

Referring now to FIG. 4B, when the ideal shape of beveled magnetic zones 42' is attained, the outputs of the encoder sensors at the left and right ends of encoder magnet 32 should approximate the figure. That is, the sum of the signal from the left beveled magnetic zone 42', and the signal from the right beveled magnetic zone 42' should remain about constant.

Returning now to FIG. 4, each encoder sensor 38 is preferably a Hall-effect device. A Hall-effect device produces a current when exposed to one magnetic polarity (north or south) but is insensitive to the opposite magnetic polarity. Encoder sensors 38 are disposed into encoder sensor groups 40 consisting of four encoder sensors 38 spaced in the direction of travel. Each encoder sensor group 40 is spaced from its neighboring encoder sensor group by a distance D. Distance D is seen to be equal to the center-to-center distance between the beveled magnetic zones 42 at the ends of encoder magnet 32. The four encoder sensors 38 in each encoder sensor group 40 are spaced in the direction of travel of movable stage 12 in relation to the center-to-center distance between magnetic zones in encoder magnet 32. For purposes of description, the center-to-center distance between magnetic zones of like polarity is considered to be 360°. Thus, the center-to-center distance between adjacent magnetic zones is considered to be 180°, and the distance between the center of a zone and its edge is considered to be 90°.

It is conventional for encoders to produce a sine and a cosine signal, relatively 90° out of phase, for use in detecting the direction of incremental motion of a stage. With magnetically actuated Hall-effect devices, this conventional technique presents a problem in that a Hall effect device responds only to one magnetic polarity (north or south) and is insensitive to the opposite polarity. To solve this problem, each encoder sensor group 40 includes one encoder sensor 38s+ for producing a sine+ output, and a second encoder sensor 38s− for producing a sine− output. Encoder sensor 38s− in encoder sensor group 40 is spaced 180° in the direction of travel from its companion encoder sensor 38s+. When the sine+ and sine− signals are added in motor controller 18, the desired sinusoidal sine signal is available. A cosine+ encoder sensor 38c+ is spaced 90° in the direction of travel from sine+ encoder sensor 38s+. A cosine− encoder sensor 38c− is spaced 180° in the direction of travel from its companion cosine+ encoder sensor 38c+. When the cosine+ and cosine− signals are added in motor controller 18, the desired cosine signal is generated.

The spacing D between encoder sensor groups 40 is such that, as a particular encoder sensor 38 in one encoder sensor group 40 is aligned with beveled magnetic zone 42 at one end of encoder magnet 32, its counterpart is aligned with beveled magnetic zone 42 at the opposite end of encoder magnet 32. As illustrated, for example, when sine+ encoder sensor 38s+ in the left-hand encoder sensor group 40 is aligned with the center of the left-hand beveled magnetic zone 42, its counterpart sine+ encoder sensor 38s+ is aligned with the right-hand beveled magnetic zone 42 at right end of encoder magnet 32.

All corresponding encoder sensors 38 are connected in parallel to a line connected to motor controller 18. Four separate lines are illustrated to carry the +/− sine/cosine signals. As movable stage 12 moves along, the encoder sensor 38 coming into alignment with beveled magnetic zone 42 at one end of encoder magnet 32 produces an increasing signal while the encoder sensor 38 moving out of alignment with beveled magnetic zone 42 at that end produces a decreasing signal. Since all corresponding encoder sensor signals are added, the signal transition, as one encoder sensor group 40 becomes active, and its neighbor encoder sensor group 40 becomes inactive is smooth, without a discontinuity that would interfere with detecting motion. One skilled in the art will understand that the above spacing can be increased by 360° between any +/− pair of encoder sensors 38 without affecting the resulting output signal. Also, in some applications, since the outputs of sine encoder sensors are, in theory, 180° out of phase with each other, both sine encoder outputs could be applied to a single conductor for connection to motor controller 18. In other applications, four separate conductors, as illustrated, may be desired.

In a preferred embodiment of linear motor 10, a third encoder sensor group 40 (not shown) is disposed midway between the illustrated encoder sensor groups 40. This has the advantage that, during the transition of beveled magnetic zones 42 at the ends of encoder magnet 32 from one encoder sensor group 40 to the next encoder sensor group 40, resulting departures of the encoder signal due to tolerances in the lengths of encoder magnet 32, and the precise spacing of encoder sensor groups 40 is at least partially swamped out by the signal generated by an encoder sensor group 40 located midway between the ends of encoder magnet 32.

Referring again to FIG. 1A, it will be recognized that the functions of communications device 24 are satisfied by the above-described wireless magnetic system for communicating the motion of movable stage 12 to motor controller, without requiring any active devices on movable stage 12. One limitation on such a system is the difficulty in producing closely spaced alternating magnetic zones in encoder magnet 32. Thus, the positional resolution of such a system is relatively crude.

Figure 5:
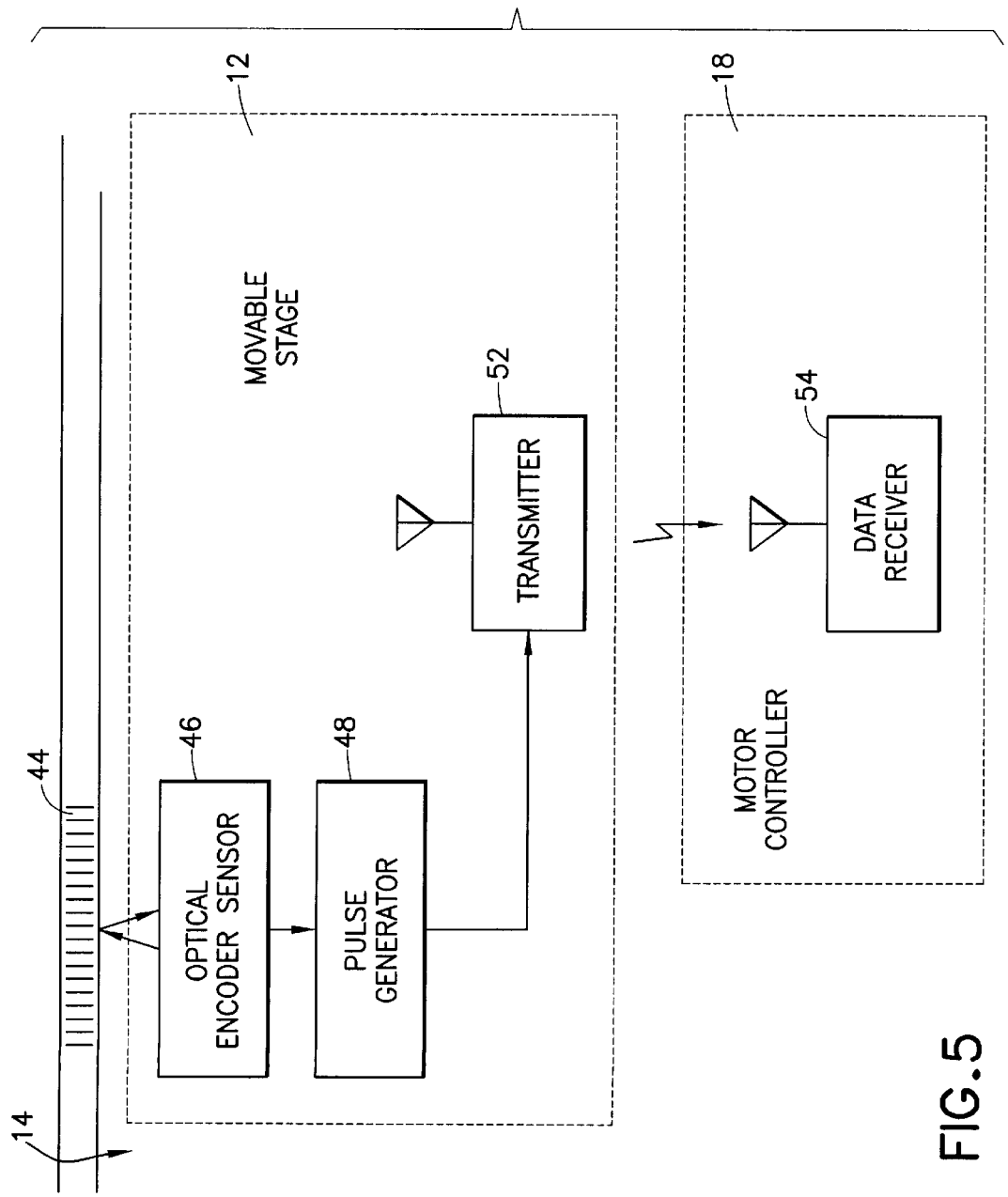
FIG. 5 is a schematic diagram showing an embodiment of a wireless linear motor employing active communications elements on the movable stage.

Referring now to FIG. 5, one solution to the resolution problem includes a conventional encoder tape 44 in a fixed location along path 14, and a conventional optical encoder sensor 46 on movable stage 12. Encoder tape 44 is ruled with fine parallel lines. Optical encoder sensor 46 focuses one or more spots of light on encoder tape 44, and detects the changes in light reflected therefrom as lines and non-lines pass in front of it. Generally, optical encoder sensor 46 produces sine and cosine signals for determining motion. Since the parallel lines on encoder tape 44 are closely spaced, very fine resolution is possible. An optical encoder system can be added to the less precise magnetic encoder system in order to obtain enhanced position resolution.

The sine and cosine outputs of optical encoder sensor 46 are applied to a pulse generator 48. The output of pulse generator 48 is applied to a transmitter 52. Transmitter 52 transmits the pulse data to a data receiver 54. Although the system is shown with antennas, implying that transmission and reception use radio frequency, in fact, any wireless transmission system may be used. This includes radio, optical (preferably infrared), and any other technique capable of transmitting the information, without requiring connecting wires, from movable stage 12 to stationary motor controller 18.

The embodiment of the invention of FIG. 5 has the disadvantage that transmitter 52 is active at all times. Since the system is wireless, the illustrated apparatus on movable stage 12 is battery operated. Full-time operation of transmitter 52 reduces battery life.

Figure 6:
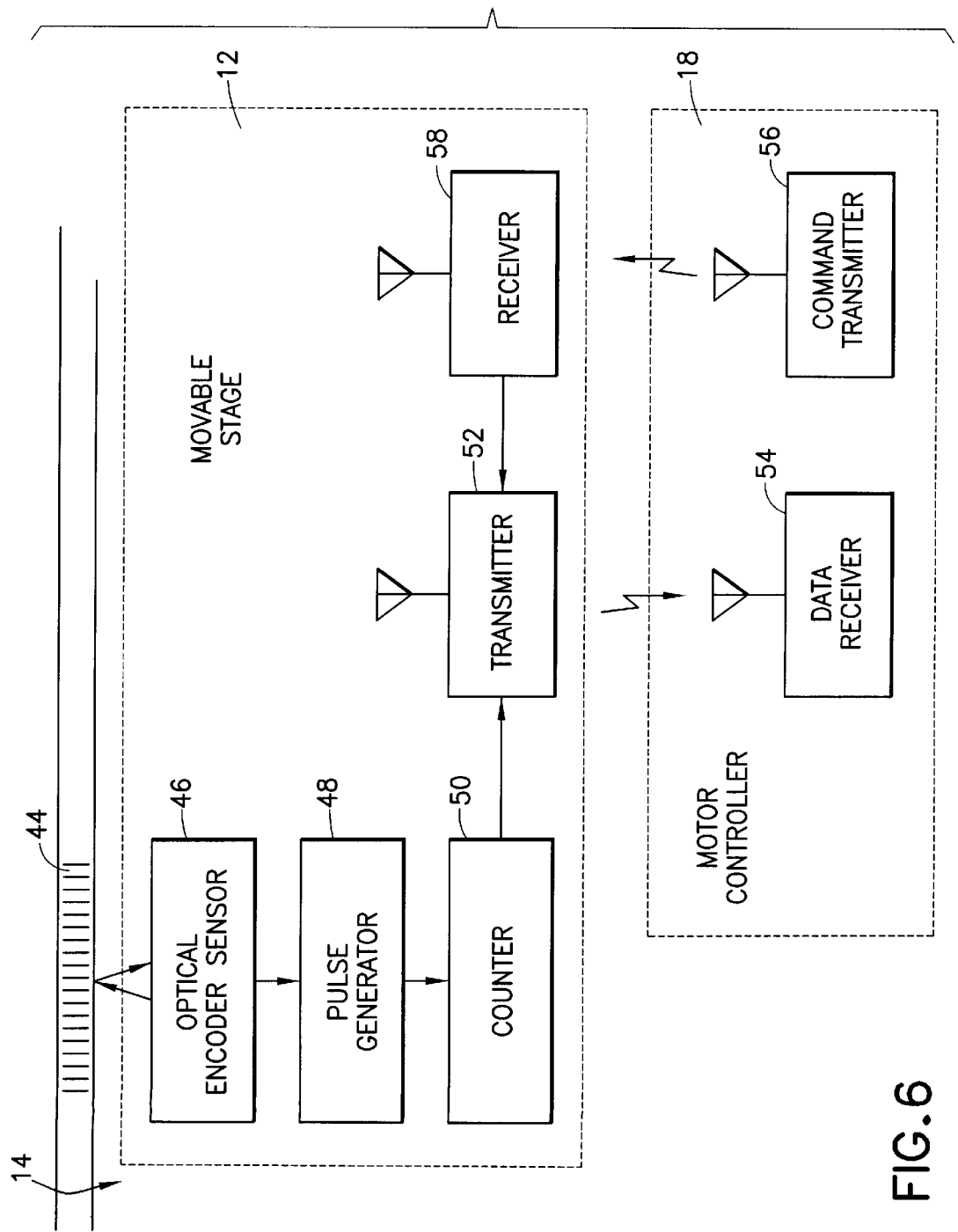
FIG. 6 is a schematic diagram showing an embodiment a wireless linear motor employing an active command-response position feedback system.

Referring now to FIG. 6, an embodiment of the invention adds to the embodiment of FIG. 5, a command transmitter 56 in motor controller 18, a receiver 58 and a counter 50 in movable stage 12. In this embodiment, transmitter 52 remains off until commanded through receiver 58 to transmit the count stored in counter 50. The command to transmit is sent from command transmitter 56 to receiver 58. Although this embodiment requires that receiver 58 remain active at all times, the power drain of a solid state receiver is generally lower than that of a transmitter. As in prior embodiments, any wireless technology may be used in receiver 58 and command transmitter 56.

In one embodiment of the invention, the magnetic encoder system may be omitted, and the entire encoder operation may be accomplished using optical encoder sensor 46 facing optical encoder tape 44, and transmitting the position or motion data from the stage using electromagnetic means, such as described above.

Figure 7:
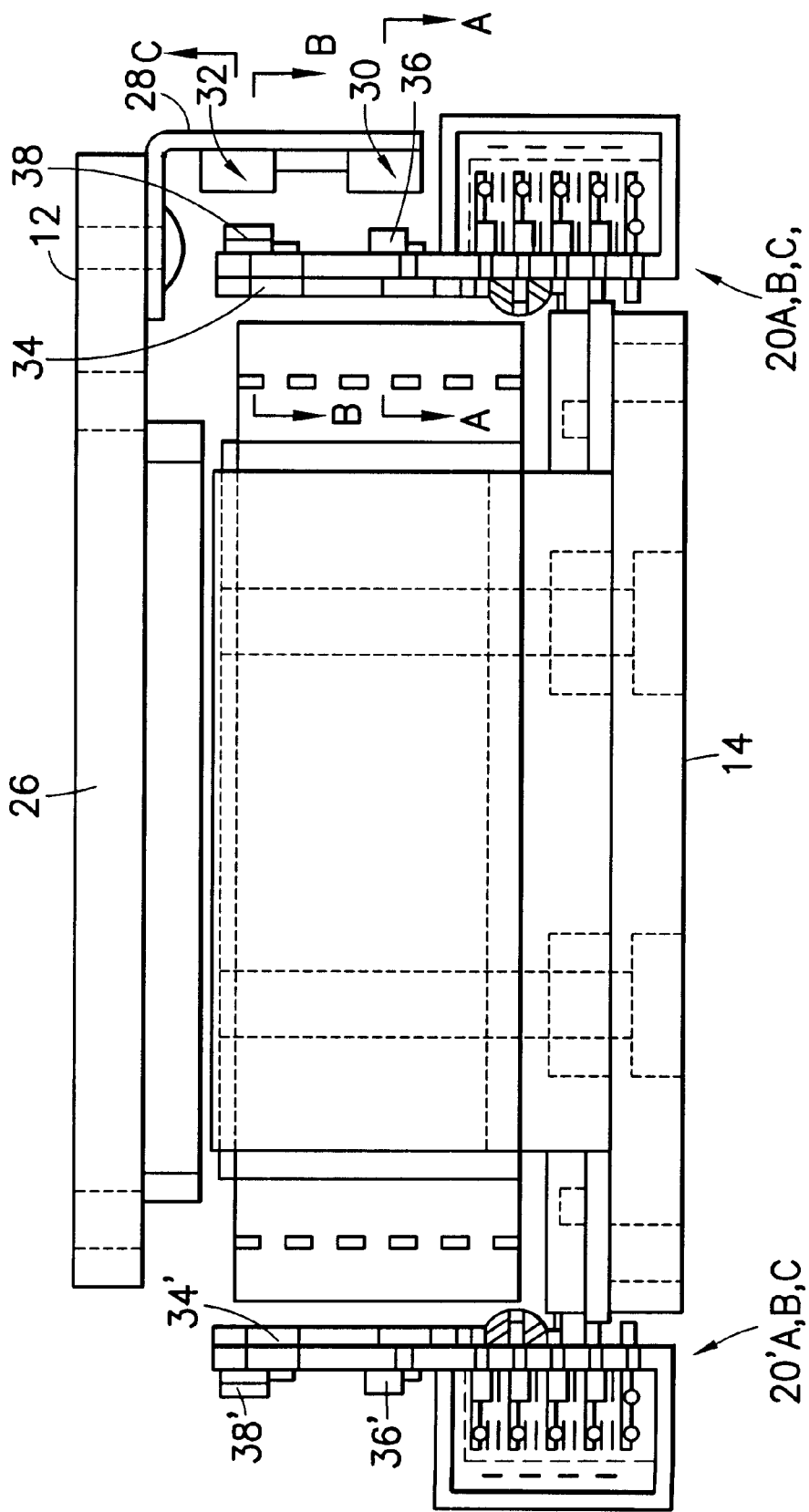
FIG. 7 is a cross section similar to FIG. 1B, except that provision is made in the path for controlling a second movable stage along the same path.

Referring now to FIG. 7, an embodiment of the invention is shown in which it is possible to drive more than one movable stage 12 along path 14. Each movable stage 12 requires independent application of armature power from motor controller 18, independent armature switching and independent position communication from the movable stage back to motor controller 18. The embodiment in FIG. 7 continues to show movable stage 12, but adds a second rail 34' on the second side of path 14 for use by a second movable stage (not shown). The second movable stage is similar to movable stage 12, except that a pendant arm 28' (not shown), supporting switching and encoder magnets (not shown), if in a visible position, would be located on the left side of the drawing. Second rail 34' includes encoder sensors 38' and switching sensors 36', corresponding to the encoder and switching sensors of the embodiment of FIG. 1B. Conductors 20'A, B and C carry motor drive power, separately generated in motor controller 18, to the switches feeding power to the armature windings 16A, B and C, along paths separate from conductors 20A, B and C. In this manner, the second stage is separately controlled, and its motion is separately fed back to motor controller 18.

Figure 8:
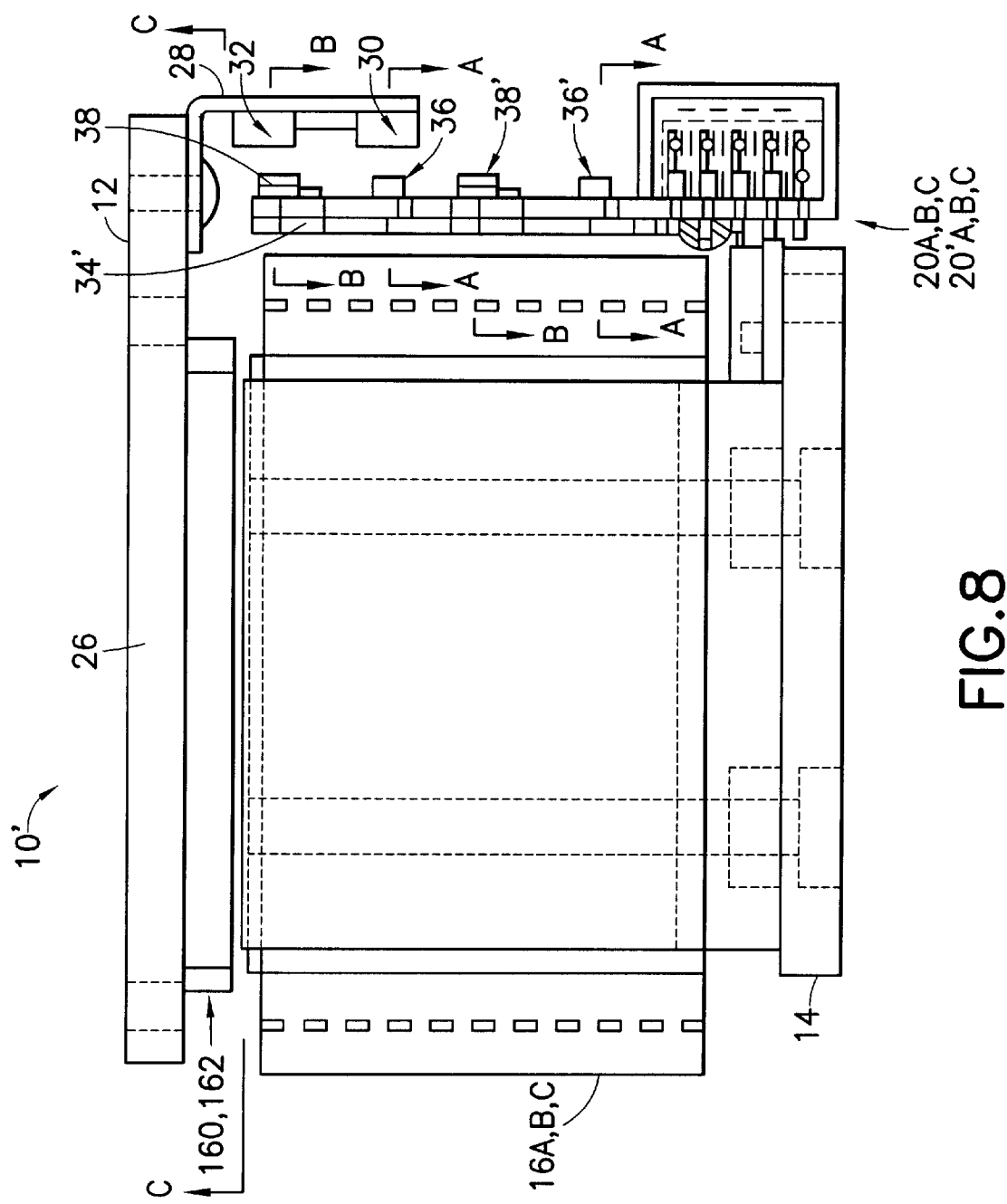
FIG. 8 is a cross section similar to FIG. 1B, except that provision is made in the path for controlling any desired number of stages along the same path.

Referring now to FIG. 8, there is shown an embodiment of the invention adapted to controlling and driving two movable stages 12 (and 12', not shown). In this embodiment, rail 34', besides supporting encoder sensor 38 and switching sensor 36, also supports, spaced below, a second encoder sensor 38' and a second switching sensor 36'. It will be understood power to armature windings 16A, B and C is independently controlled by separate switches that feed motor power from conductors 20A, B and C, when influenced by switching magnet 30, and from conductors 20'A, B and C when influenced by switching magnet 30'.

Figure 9:
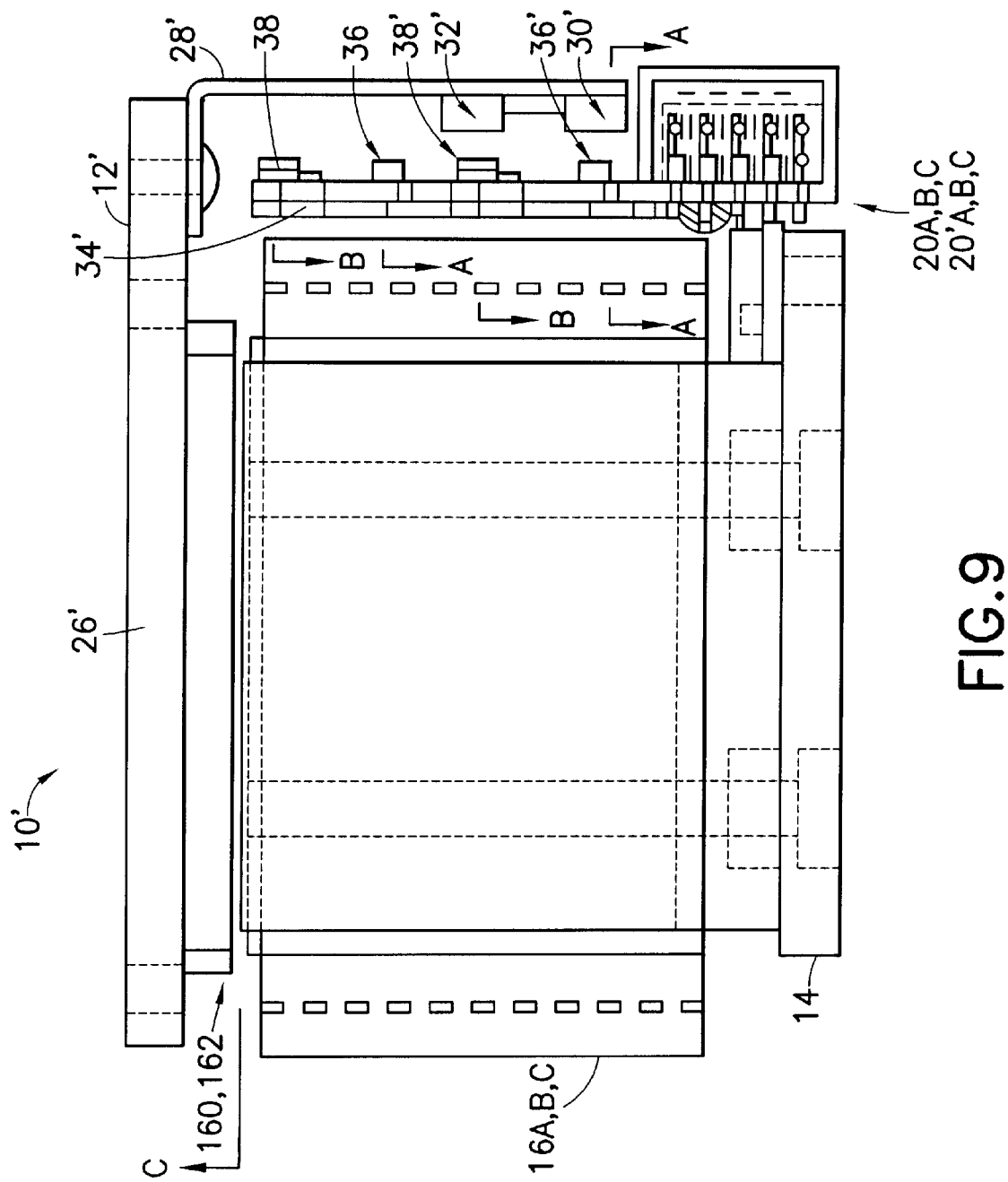
FIG. 9 is a cross section similar to FIG. 1B, except that provision is made in the path for controlling two or more stages along the same path.

Referring to FIG. 9, a second movable stage 12' is shown, for use with rail 34' of FIG. 8. Second movable stage 12' includes a pendant arm 28', on the same side of movable stage 12 of FIG. 8, but extending further downward to accommodate an encoder magnet 32' and switching magnet 30' aligned with second encoder sensors 38' and second switching sensors 36', respectively. It would be clear to one skilled in the art that more than two movable stages could be controlled by adding additional elements to rail 34', and by installing suitably long pendant arms 28, 28' . . . 28" to each movable stage 12.

Figure 10:
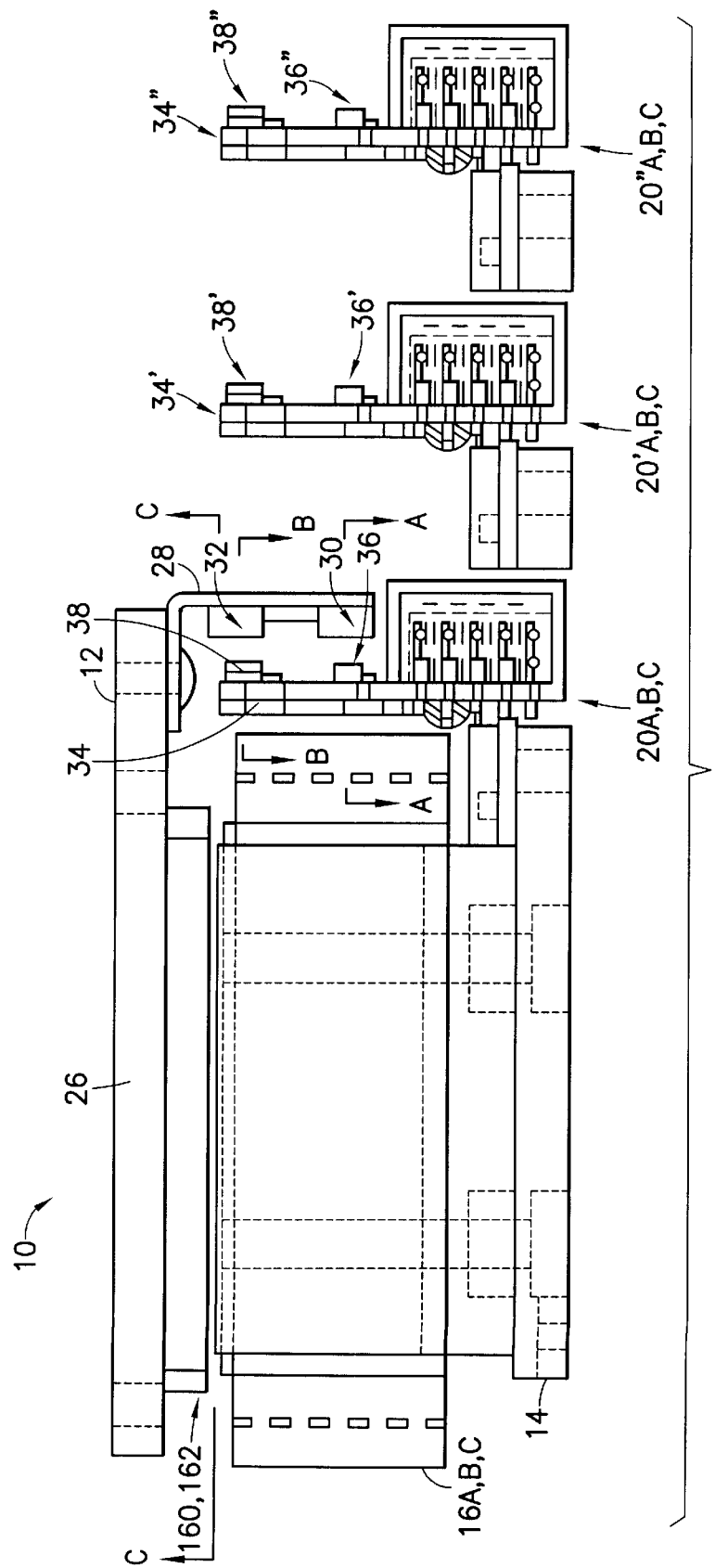
FIG. 10 is a cross section similar to FIG. 1B, except that provision is made in the path for controlling three or more stages along the same path.

The present invention is not limited to two movable stages on a single path. Any number of movable stages may be controlled independently along the same path 14. Referring to FIG. 10, for example, three rails 34, 34' and 34" are spaced parallel to each other outward from path 14. Each of rails 34, 34' and 34" includes thereon encoder sensors 38, 38' and 38", and switching sensors 36, 36' and 36". Each movable stage 12, 12' and 12" (only movable stage 12 is shown) includes a pendant arm 28, 28' and 28" (only pendant arm 28 is shown) adjacent to the sensors on its respective rail 34, etc. Encoder magnets 32, 32' and 32" (only encoder magnet 32 is shown), and switching magnets 30, 30' and 30" (only switching magnet 30 is shown) are installed on their respective pendant arms. With the interleaving of pendant arms 28, etc. between rails 34, etc., as many stages 12, etc. as desired may be accommodated, driven and controlled on a single path 14.

Figure 12:
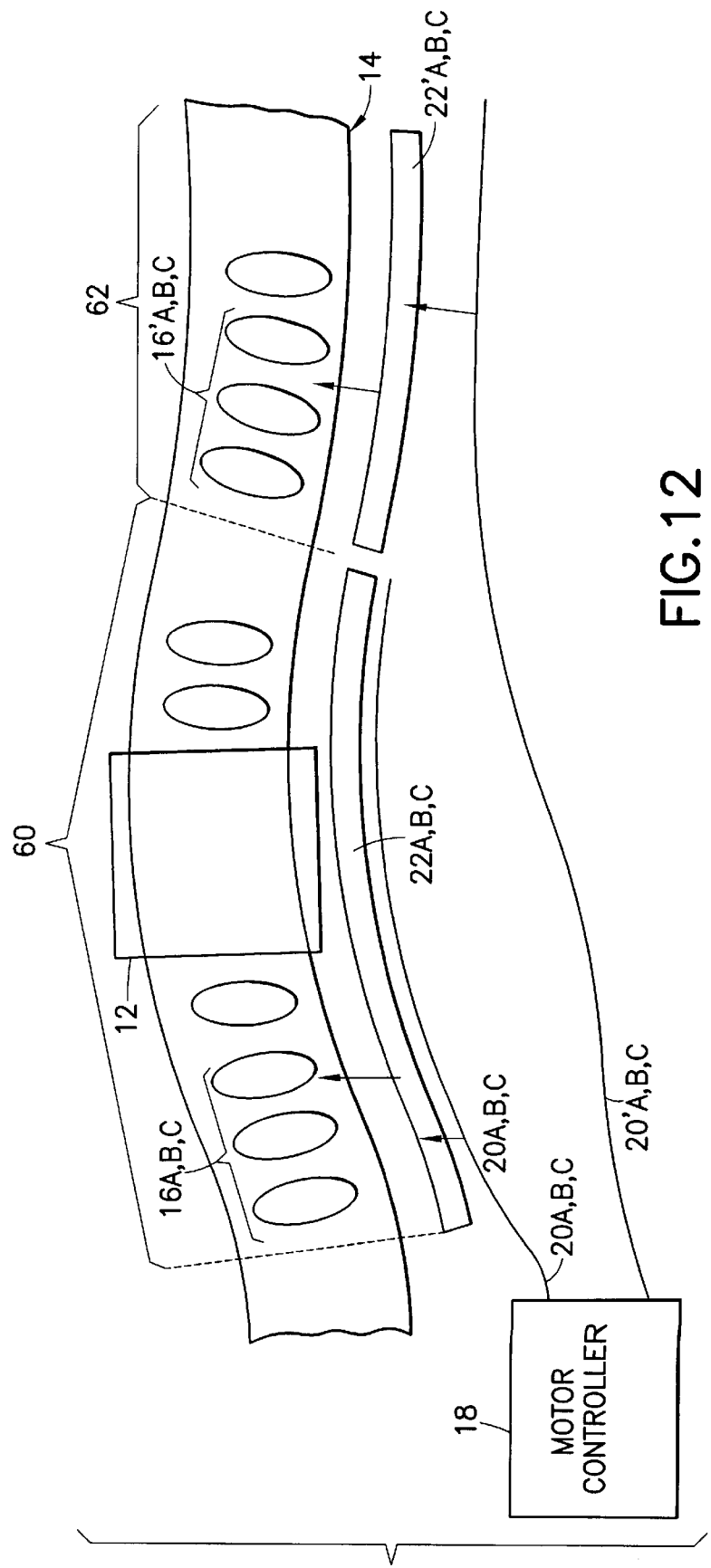
FIG. 12 is a diagram showing a path adapted for open-loop control of a movable stage over one section and closed-loop control over another section.

In some applications, it may be desirable to have closed-loop control in some regions of the path for precise positioning, but where open-loop control may be desirable over other regions of the path. Referring to FIG. 12, a region of closed-loop control 60, along path 14 receives drive power from motor controller 18 on a first set of conductors 20A, B, and C through magnetically actuated switches 22A, B and C, as previously described. Position or motion feedback in region 60, as previously described, permits motor controller 18 to accurately control the position and velocity of movable stage 12. A region of open-loop control 62, along path 14 receives drive power from motor controller 18 on a second set of conductors 20'A, B and C. When movable stage 12 is in region 62, motion feedback is either not generated, or is not responded to by motor controller 18. Instead, motor controller 18 generates a programmed phase sequence for open-loop control of movable stage 12. This drives movable stage at a predetermined speed. Once a region of closed-loop control is attained, movable stage 12 resumes operation under control of motor controller 18.

It is also possible to provide path switching, similar to the switching used on railroads, to direct movable stage 12 flexibly along different paths.

Figure 11:
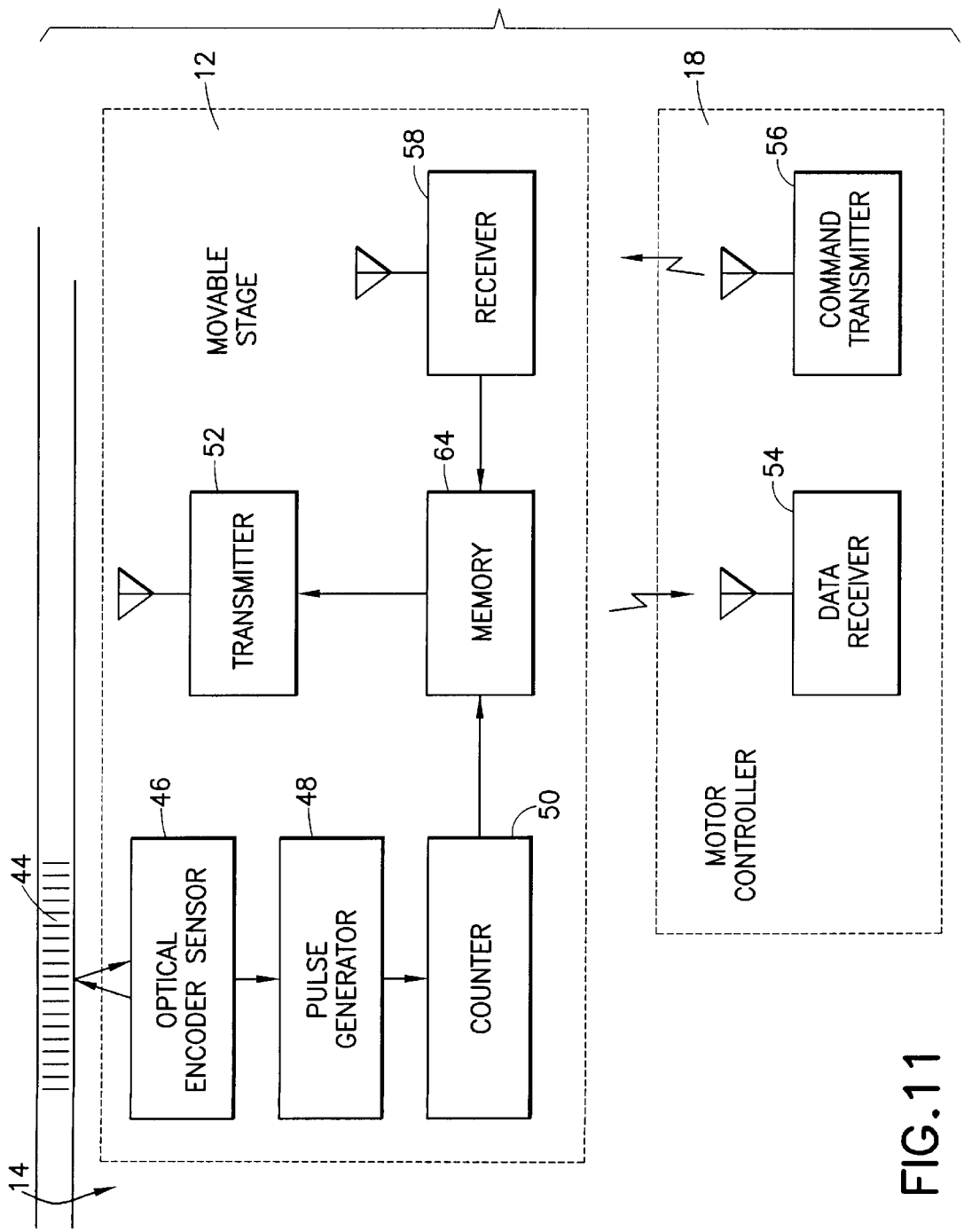
FIG. 11 is a schematic diagram of a wireless linear motor employing an active command-response system with memory on-board the movable stage.

Referring now to FIG. 11, an embodiment, similar to that of FIG. 6, adds a memory 64 for receiving commanded motion information. Once commanded motion information is stored, it is continuously compared with the content of counter 50 until a commanded condition is attained. During the interval between storage of the information, and the accomplishment of the commanded condition, transmitter 52 may remain quiescent. In some applications, receiver 58 may also remain quiescent during such interval, thereby consuming a minimum amount of battery power.

Figure 13:
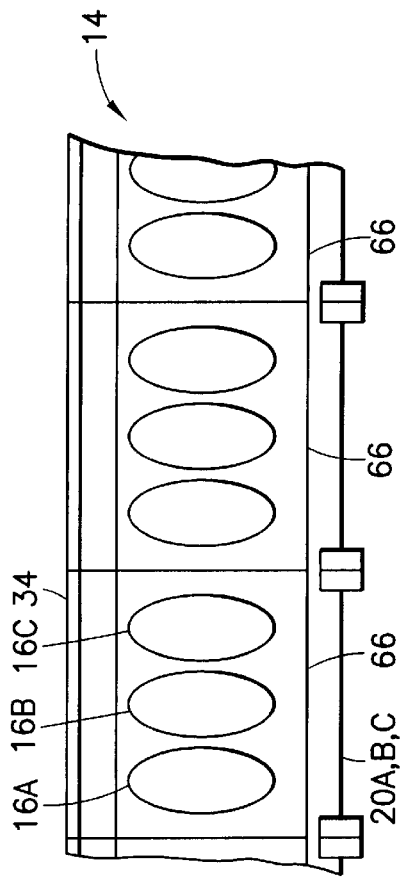
FIG. 13 is a diagram showing several path modules connected together to form a path.

Referring now to FIG. 13, the power consumption of the above-described system is independent of the length of path 14, since only active armature windings 16 are energized. Consequently, it is convenient to be able to construct a path 14 of any length by simply adding path modules 66 end to end. Each path module 66 includes at least one armature winding 16, an associated portion of rail 34 and conductors 20A, B and C. Conductors 20A, B and C on adjacent path modules are connected together by connectors 68. Path modules 66 are illustrated to contain three armature windings 16A, B and C. It will be understood that switching sensors, together with their semiconductor switches, for the contained armature windings are mounted on the portion of rail 34 associated with that path module 66. In addition, position feedback, if magnetic encoder sensing is used, is also included on suitable path modules 66. As noted above, encoder sensors are spaced relatively widely apart. In a preferred embodiment, each path module should be long enough to contain at least one encoder sensor group. One system of this sort has been long enough to contain 9 armature windings (3 repetitions of phases A, B and C armatures).

Figure 14:
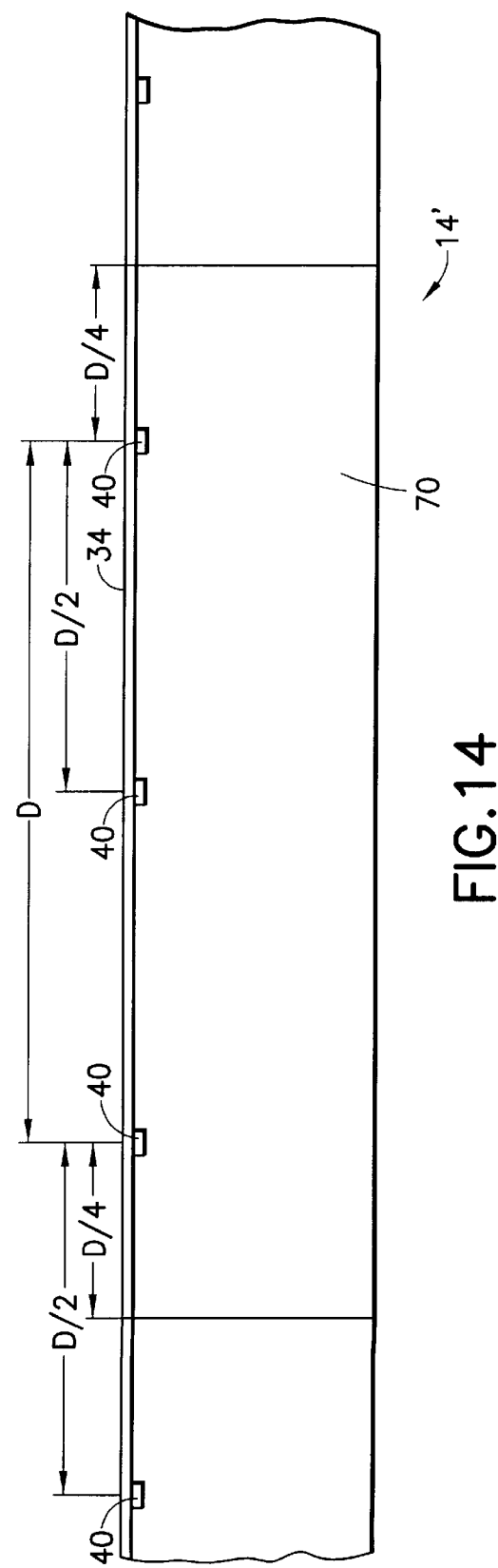
FIG. 14 is a diagram showing a preferred embodiment of a path module having three encoder sensor groups spaced along the path of the module.

Referring now to FIG. 14, a preferred embodiment of a path module 70 includes armature windings, as described above, plus three encoder sensor groups 40 spaced D/2 apart (D is the center-to-center spacing of beveled magnetic zones 42 at the ends of encoder magnet 32). Path module 70 extends a distance D/4 beyond the outer encoder sensor groups 40. In this way, when the next path module 70 is connected end to end, the distance between the nearest encoder sensor groups 40 on the mated path modules 70 is D/2 as is desired. Path modules 70 are connected together to form a path 14' of any desired length or shape.

Figure 15:
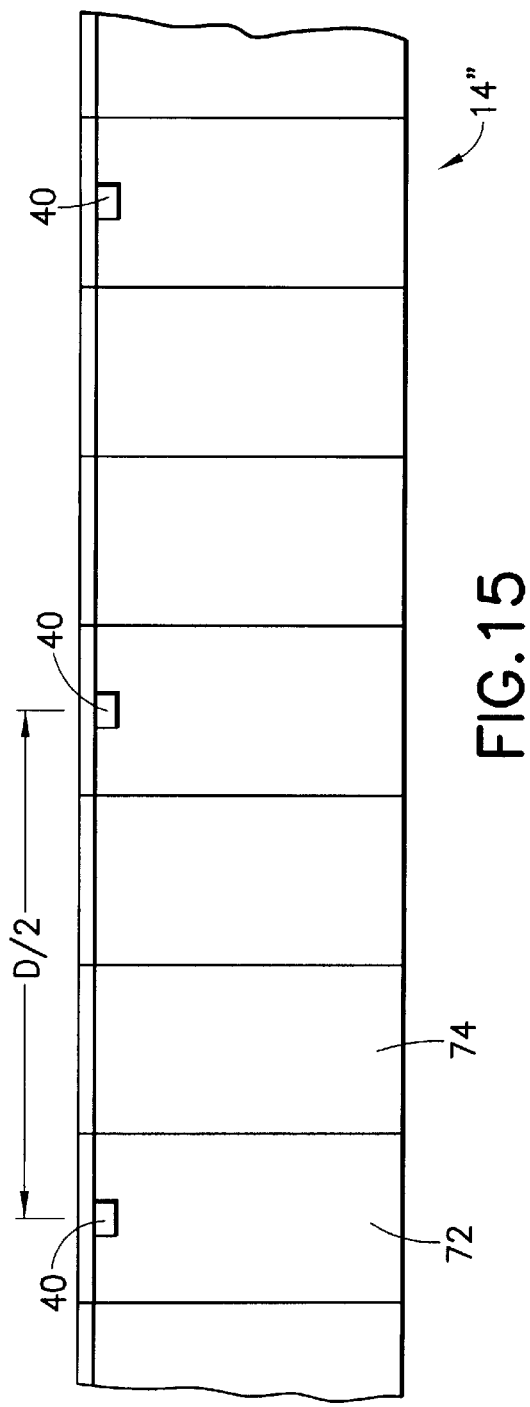
FIG. 15 is a diagram showing an embodiment of two path modules coupled together, one module having a sensor, and another module without a sensor.

Referring now to FIG. 15, another preferred embodiment includes two path modules 72, 74 having armature windings, as described above. One module has an encoder sensor group 40, and another module does not contain an encoder sensor. Path modules 72, 74 are connected together to form a path 14" such that encoder sensor groups 40 in path modules 72 are spaced D/2 apart (D is the center-to-center spacing of beveled magnetic zones 42 at the ends of encoder magnet 32). Any desired path 14" can be achieved using a combination of path modules 72 and 74. It is understood by one skilled in the art that other arrangements of path modules 72, 74 can be used to form any desired shape or length path 14" and any other desired spacing of encoder sensor groups 40, so long as provision is made for spacing encoder sensor groups 40 a desired repeating distance apart. One embodiment includes a modular path module from which encoder sensor groups are omitted. However, provision is made for clamping, or otherwise affixing, encoder sensor groups 40 anywhere along the assembled modular path. When affixing the encoder sensor groups 40, the appropriate spacing (D, D/2, D/4, etc.) is observed to ensure that the encoding signal is produced without distortion or dropouts during transitions from one path module to another.

Figure 16:
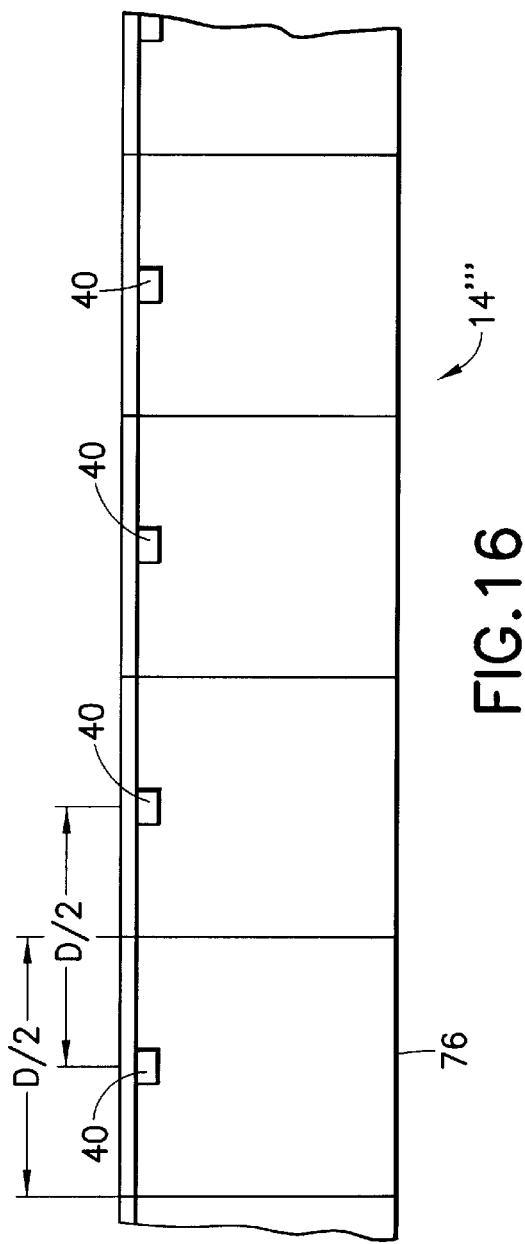
FIG. 16 is a diagram showing an alternative embodiment of a path module having a single sensor.

Referring now to FIG. 16, an alternative embodiment of a path module 76 includes armature windings, as described above, and an encoder sensor group 40. Modules 76 are connected together to form a path 14'" such that encoder sensor groups 40 in path modules 76 are spaced D/2 apart (D is the center-to-center spacing of beveled magnetic zones 42 at the ends of encoder magnet 32). Any desired length or shape path 14'" can be achieved using a combination of path modules 76.

The connection of signals and power along linear motor 10, especially in the case of modular devices, has been described with wires and connectors joining wires in adjacent modules. Other techniques for carrying signals and power may be employed without departing from the spirit and scope of the invention. For example, instead of using wires, conductive traces on a rigid or flexible substrate may be used.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A linear motor comprising:

a path;

said path including a plurality of armature windings therein;

a plurality of magnetically actuated switches, each one of said magnetically actuated switches being aligned with one of said armature windings;

each of said magnetically actuated switches controlling application of motor drive power to its respective armature winding;

a linear motor stage movable on said path;

a plurality of motor permanent magnets on said stage facing said path for interaction with said armature windings;

a switch permanent magnet movable with said stage;

said switch permanent magnet being disposed in a position where it is effective to actuate those of said plurality of magnetically actuated switches which are within a magnetic influence thereof;

said switch permanent magnet having a length and a position effective to actuate only those magnetically actuated switches controlling their respective armature windings which are within a magnetic influence of said plurality of motor permanent magnets, and to leave all others of said plurality of magnetically actuated switches unactuated, whereby armature windings receiving power through said others remain deenergized;

an encoder magnet movable with said stage;

said encoder magnet including a plurality of magnetic zones having alternating magnetic polarities thereon; and at least one magnetically actuated encoder sensor positioned within an influence of said encoder magnet, whereby movement of said encoder magnet past said at least one magnetically actuated encoder sensor produces an encoder signal useful for determining a position of said stage.

2. A linear motor comprising:

a path;

said path including a plurality of armature windings therein;

a movable stage movable on said path;

a plurality of motor permanent magnets on said stage facing said path;

first non-contact means for applying motor drive power only to those armature windings which are within a magnetic influence of said motor permanent magnets, and leaving a remainder of said armature windings cut off from said motor drive power; and second non-contact means for producing an encoder signal available off said stage.

3. A linear motor according to claim 2, wherein:

said plurality of armature windings are non-interlaced; and said first non-contact means includes means for turning respective armature windings on and off at minimum current.

4. A linear motor according to claim 3, wherein said first non-contact means includes:

a switching magnet movable with said stage;

a length of said switching magnet being substantially the same as a center-to-center distance, in a travel direction of said stage, of extreme outer ones of said permanent magnets;

a plurality of magnetically actuated switching sensors;

each of said plurality of magnetically actuated switching being aligned with a respective one of said plurality of armature windings;

each of said switching sensors being effective for applying drive power to its respective armature winding when it is within an magnetic influence of said switching magnet, and for removing drive power from its respective armature winding when it is outside said magnetic influence; and ends of said switching magnet being positioned with respect to said stage to energize and deenergize switching sensors only when armatures being switched on and off are aligned with a center of a motor permanent magnet.

5. A linear motor according to claim 2, wherein said second non-contact means includes:

at least one magnetically actuated sensor along said path;

an encoder magnet on said stage;

said encoder magnet including magnetic zones along its length having alternating polarity; and said encoder magnet passing within a magnetic influence of said at least one magnetically actuated sensor, whereby said at least one magnetically actuated sensor produces an encoder signal as said encoder magnet moves therepast.

6. A linear motor according to claim 5, wherein:

said encoder magnet has a length between centers of magnetic zones at ends thereof;

said at least one magnetically actuated sensor includes at least first and second magnetically actuated sensors spaced apart a distance no greater than said length; and outputs of said at least first and second magnetically actuated sensors being connected in parallel, whereby a combined output of said first and second magnetically actuated sensors is a substantially continuous waveform as said encoder magnet moves out of alignment with said first or second magnetically actuated sensor and into alignment with the other thereof.

7. A magnet configuration for a permanent magnet linear motor stage, comprising:

n motor magnets aligned side by side along a portion of a length of said stage;

said n motor magnets having alternating magnetic polarities to produce a substantially sinusoidal magnetic field along said portion;

said stage being used with a path having a plurality of armature windings facing said n motor magnets;

said armature windings receiving driving power effective for interaction with said n motor magnets to impose a force for moving said linear motor stage in a direction of said path;

first and second additional permanent magnets;

said first and second additional permanent magnets not interacting with armature windings to produce a force;

said first additional permanent magnet being disposed parallel to said n motor magnets at a first end of said n motor magnets;

said first additional permanent magnet having a magnetic polarity opposite to the magnetic polarity of the closest adjacent motor magnet;

said second additional permanent magnet being disposed parallel to said n motor magnets at a second end of said n motor magnets; and said second additional permanent magnet having a magnetic polarity opposite to the magnetic polarity of the closest adjacent motor magnet, whereby a combined magnet field at said first and second ends of said portion is maintained substantially sinusoidal by the presence of said first and second additional permanent magnets.

8. A magnet configuration according to claim 7 wherein a dimension of said first and second additional permanent magnets in a travel direction of said stage is less than a dimension of each of said n motor magnets.

9. A magnet configuration according to claim 7 wherein a dimension of said first and second additional permanent magnets in a travel direction of said stage is equal to a dimension of each of said n motor magnets.

* * * * *